Nov. 4, 1941.  C. W. CUNDIFF  2,261,874
TWO-WAY FLAT BOTTOM DITCHER
Filed Nov. 28, 1940  2 Sheets-Sheet 2
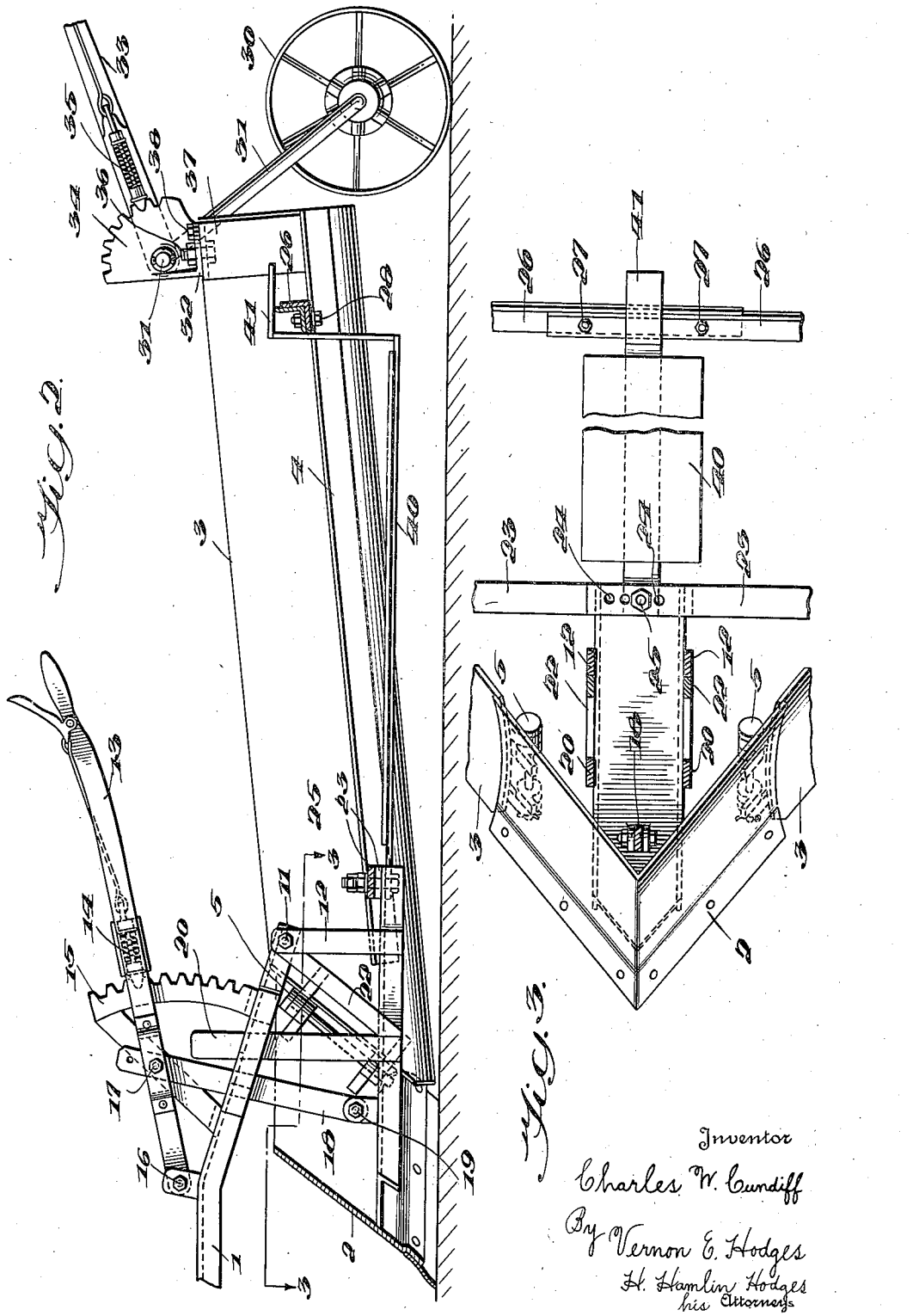
Inventor
Charles W. Cundiff
By Vernon E. Hodges
H. Hamlin Hodges
his Attorneys Patented Nov. 4, 1941

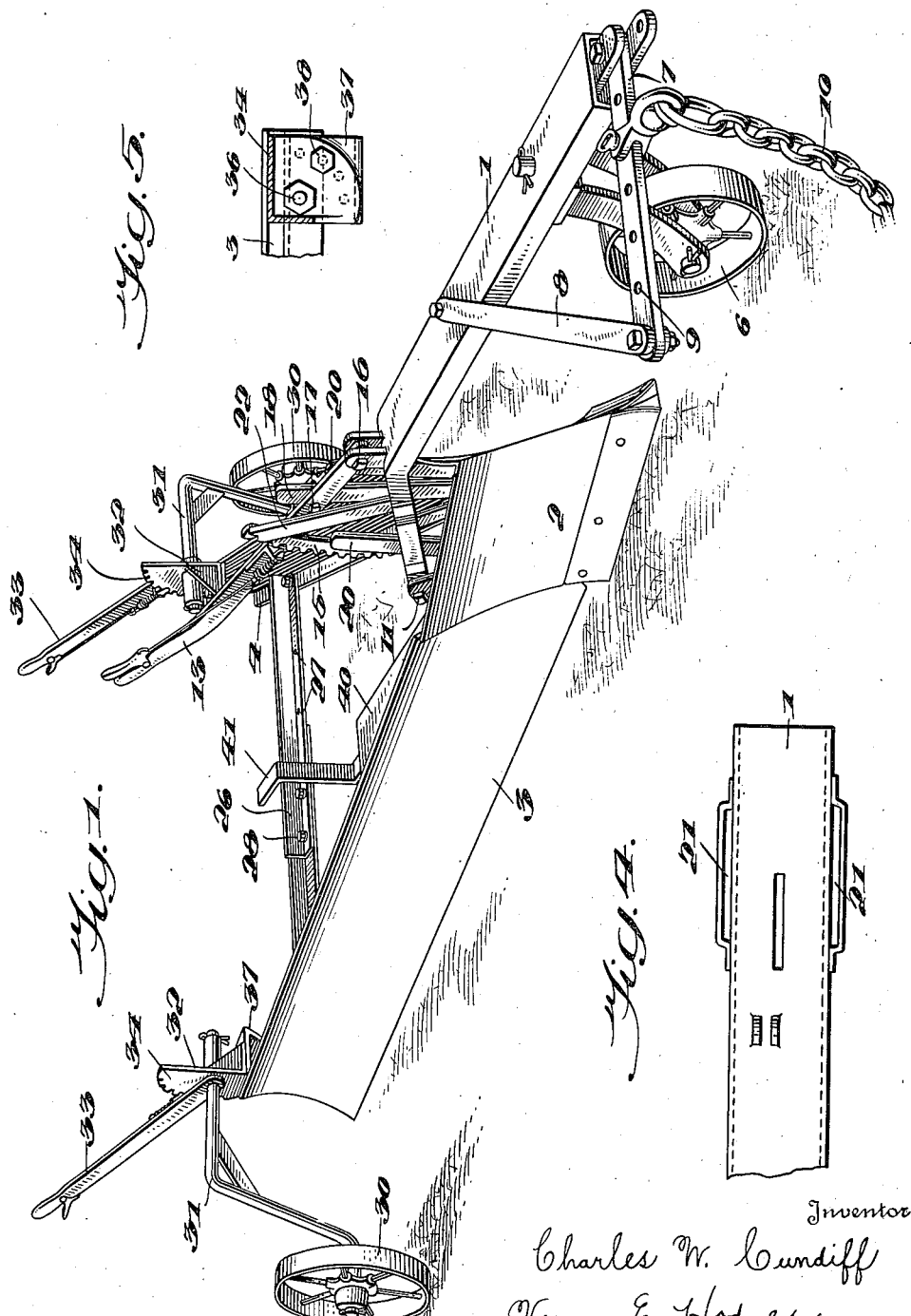

2,261,874

UNITED STATES PATENT OFFICE 2,261,874

TWO-WAY FLAT BOTTOM DITCHER

Charles W. Cundiff, Owensboro, Ky.

Application November 28, 1940, Serial No. 367,637

3 Claims. (Cl. 37—98)

My invention relates to an improvement in two-way flat bottom ditchers.

The object of this machine is to throw dirt both ways and make flat-bottom ditches for irrigation purposes.

The invention comprises two scraper blades hinged at the front end so that they can be adjusted to any angle up or down, or in and out, according to the width of the ditch to be dug.

In the accompanying drawings:

Fig. 1 is a view in perspective;

Fig. 2 is a view in longitudinal section;

Fig. 3 is a fragmentary horizontal section;

Figs. 4 and 5 are fragmentary details.

The numeral 1 represents a draw-beam; 2, a plow; and 3, the scraper blades of which there are two, one on each side of the machine.

These scraper blades are preferably strengthened throughout their length by angle-irons 4, and the blades are connected to the plow by hinges 5 at their forward ends. These hinges are preferably set diagonally as shown, with the result that the rear ends of the scraper-blades may move upwardly as they are swung outwardly.

The draw-beam 1 is supported on a swivel caster-wheel 6 at the forward end, and draft is applied to the cross-bar 7 extending laterally from the forward end of the draw-beam 1, as shown in Fig. 1, and this is held in position at its outer end by brace 8 extending from the draw-bar to the draw-beam. Several holes 9 are provided in this cross-bar 7 for attachment of the chain 10 from the motive power. The draw-beam 1 has a hinged connection 11 at the upper end of the post 12. A hand-lever 13 with the usual spring latch 14 operating in connection with the toothed segment 15, is pivotally connected at its forward end, to the draft beam by a bolt 16, and it also has pivotal connection through a bolt 17 with the floating fulcrum bar 18 which is pivotally connected by a bolt 19 to the plow 2, as shown in Figs. 2 and 3.

By means of the foregoing elements, the forward end of the ditcher may be raised or lowered by moving the hand-lever 13 up or down and latching it in the toothed segment 15 when the desired elevation is obtained.

In order to guide the parts in their up and down movement, the vertical standards 20 are provided. There are two of these, and they are rigidly secured to the plow 2 at their lower ends and extend through slots 21 provided therefor in the sides of the draw-beam 1, as better shown in Fig. 4. Braces 22 extend diagonally to the upper ends of the posts 12 where they are connected by the bolts 11 which pivotally join the draw-beam 1 to the posts.

The scraper-blades are adjustably connected across by two sets of overlapping bars at the forward end, preferably, by flat bars 23, each of which has several holes 24 at their overlapping ends, to receive a bolt 25 which secures these overlapping ends in position when the scraper-blades are adjusted to the proper angle.

The other set of adjusting bars 26, 26, at the rear are preferably made of angle-iron as shown in Fig. 2, and they also have several holes 27 at their overlapping ends to provide for adjustment, and when adjusted are held together by the bolts 28.

The rear end of the ditcher is supported on wheels 30, and the axles 31 on which these wheels turn are bent into L-shape and supported to turn in the toothed segments 34 supported in turn at the rear ends of the scraper blades; and hand-latch levers 33 are employed for raising and lowering these wheels 30 to raise, lower and adjust the elevation of the rear ends of the scraper blades, and the latches 35 on the levers 33 are adapted to engage these teeth according to the position of the hand-levers 33, one or both of which may be adjusted according to requirements.

The toothed segments 34 are pivotally mounted by means of the bolts 36 on the supports 37, and may be swung independently on these bolts 36 as a center through the manipulation of the hand-levers 33, whereby to swing the wheels 30 to the proper position relative to the outward or inward adjustment of the scraper-blades 3. Bolts 38 hold the brackets 32 in place after they shall have been adjusted.

A platform 40 is provided for the operator to stand on if and when his weight is required in the digging of the flat bottom ditch. This platform may be fastened at the forward end by the bolt 25, which connects the bars 23 together and at its rear end has an extension 41 which rests upon the angle-iron cross-bars 26.

This invention provides a simple machine especially adapted for digging flat botom ditches. It comprises few parts easily repaired and replaceable, and the machine is so constructed and organized that it can be raised, lowered, turned and otherwise adjusted according to requirements.

I claim:

1. In a ditcher of the character described, the combination of a plow, a draw-beam in the general form of an obtuse angle, the rear end of which extends downwardly, posts extending from points inside the plow, to the upper ends of which the rear end of the draw-beam is pivotally connected, the inclined portion of the draw-beam having guide slots at each side thereof, upstanding standards located within the plow and extending slidably through said slots to guide and provide lateral support for the plow in its vertical adjustments, a hand-lever pivotally connected to the draw-beam, a floating fulcrum bar pivoted within the plow, to the upper end of which the hand-lever is pivotally connected, locking means connected with the hand-lever for locking the latter to hold the plow in various predetermined vertical adjustments, and wheels located forward and rearward of the plow in triangular relation to one another.

2. In a ditcher of the character described, the combination of a plow, a draw-beam in the general form of an obtuse angle, the rear end of which extends downwardly, posts extending from points inside the plow, to the upper ends of which the rear end of the draw-beam is pivotally connected, the inclined portion of the draw-beam having guide slots at each side thereof, upstanding standards located within the plow and extending slidably through said slots to guide and provide lateral support for the plow in its vertical adjustments, a hand-lever pivotally connected to the draw-beam, a floating fulcrum bar pivoted within the plow, to the upper end of which the hand-lever is pivotally connected, locking means connected with the hand-lever for locking the latter to hold the plow in various predetermined vertical adjustments, wheels located forward and rearward of the plow in triangular relation to one another, upon which the ditcher is adapted to be supported, means for raising and lowering the rear wheels independently of each other, and means for independently changing the angle of the wheels.

3. In a ditcher of the character described, the combination of a sharp-pointed plow, transversely curved scraper blades hinged thereto at their forward ends with the rear edges of the plow overlapping said ends, a draw-beam in the general form of an obtuse angle, the rear end of which extends downwardly, posts extending from points inside the plow, to the upper ends of which the rear end of the draw-beam is pivotally connected, the inclined portion of the draw-beam having guide slots at each side thereof, upstanding standards located within the plow and extending slidably through said slots to guide and provide lateral support for the plow in its vertical adjustments, a hand-lever pivotally connected to the draw-beam at a point approximately at the angle formed between its ends, a floating fulcrum bar pivoted within the plow, to the upper end of which the hand-lever is pivotally connected, a toothed segment extending upwardly from the draw-beam, locking means connected with the hand-lever for locking the latter to the segment to hold the plow in various predetermined vertical adjustments, and wheels located forward and rearward of the plow in triangular relation to one another.

CHARLES W. CUNDIFF.